(12) United States Patent
Boutilier et al.

(10) Patent No.: US 7,353,191 B2
(45) Date of Patent: Apr. 1, 2008

(54) METHOD AND APPARATUS FOR SELECTING A DESIRABLE ALLOCATION OF BIDS IN A COMBINATORIAL EXCHANGE SETTING

(75) Inventors: Craig E. Boutilier, Toronto (CA); Tuomas Sandholm, Pittsburgh, PA (US); Robert L. Shields, Jr., Pittsburgh, PA (US)

(73) Assignee: CombineNet,Inc., Pittsburgh, PA (US)

( * ) Notice: Subject to any disclaimer, the term of this patent is extended or adjusted under 35 U.S.C. 154(b) by 630 days.

(21) Appl. No.: 11/065,333

(22) Filed: Feb. 24, 2005

(65) Prior Publication Data

US 2005/0192865 A1    Sep. 1, 2005

Related U.S. Application Data

(60) Provisional application No. 60/547,266, filed on Feb. 24, 2004.

(51) Int. Cl.
*G06Q 30/00* (2006.01)

(52) U.S. Cl. .............................. 705/26; 705/27; 705/37

(58) Field of Classification Search .................. 705/26, 705/27, 37, 1
See application file for complete search history.

(56) References Cited

U.S. PATENT DOCUMENTS

2002/0032621 A1* 3/2002 Smith et al. .................. 705/27
2002/0042769 A1* 4/2002 Gujral et al. .................. 705/37
2002/0165817 A1* 11/2002 Rackson et al. .............. 705/37
2002/0174054 A1* 11/2002 Grey et al. .................... 705/37
2003/0014326 A1* 1/2003 Ben-Meir et al. ............. 705/26
2004/0186805 A1* 9/2004 Gologorsky et al. .......... 705/37

OTHER PUBLICATIONS

"Minimax-Regret Strategies for Bargaining over Several Variables," P.B. Linhart and R. Radner. Journal of Economic Theory, pp. 152-178, published 1989.*
"The Effect of Regret on Optimal BIdding in Auctions," Richard Engelbrecht-Wiggans. Management Science, vol. 35, No. 6, pp. 685-692, published Jun. 1989.*

* cited by examiner

*Primary Examiner*—Jeffrey A. Smith
*Assistant Examiner*—Michael A. Misiaszek
(74) *Attorney, Agent, or Firm*—The Webb Law Firm

(57) ABSTRACT

A desirable allocation of bids in a combinatorial exchange can be selected by determining a first candidate allocation of the bids and a first value of a minimax regret, related to the difference in utility between the adversarial allocation and the candidate allocation, as a function of a first adversarial allocation of the bids. Based on the first candidate allocation, a second adversarial allocation of the bids and a first value of a maximum regret related to the difference in utility between the new adversarial allocation and the utility of the candidate allocation can be determined. When the value of the maximum regret is greater than the value of the minimax regret, the candidate allocation can be designated as the desirable allocation.

14 Claims, 4 Drawing Sheets

| CYCLE # | EQ1 | | | EQ2 | | |
|---|---|---|---|---|---|---|
| | INPUT | OUTPUT | | INPUT | OUTPUT | |
| | ADVERSARIAL ALLOCATION | MINIMAX REGRET | CANIDATE ALLOCATION | CANIDATE ALLOCATION | MAXIMUM REGRET | NEW ADVERSARIAL ALLOCATION |
| 1 | $GEN_1 = \{x'_1\}$ | $\delta_1$ | $x_1 \rightarrow$ | $x_1$ | $MR(x_1)$ | $x'_2$ |
| 2 | $GEN_2 = \{x'_1, x'_2\}$ | $\delta_2$ | $x_2 \rightarrow$ | $x_2$ | $MR(x_2)$ | $x'_3$ |
| 3 | $GEN_3 = \{x'_1, x'_2, x'_3\}$ | $\delta_3$ | $x_3 \rightarrow$ | $x_3$ | $MR(x_3)$ | $x'_4$ |

METHOD AND APPARATUS FOR SELECTING A DESIRABLE ALLOCATION OF BIDS IN A COMBINATORIAL EXCHANGE SETTING

CROSS REFERENCE TO RELATED APPLICATION

This application claims the benefit of U.S. Provisional Application Ser. No. 60/547,266, filed Feb. 24, 2004, entitled "Automated Scenario Navigation In Combinatorial Exchanges" the contents of which are hereby incorporated by reference.

FIELD OF THE INVENTION

The present invention relates to determining a good or optimal allocation in a combinatorial exchange where the bid taker has preferences for non-prices attributes.

DESCRIPTION OF RELATED ART

Combinatorial auctions generalize traditional market mechanisms to allow the direct specification of bids over bundles of items together with various types of side constraints. This form of expressive bidding is extremely useful when a bidder's valuation for collections of items—or bidder's costs in revenue allocations—exhibit complex structure. The problem of winner determination, namely, determining a cost or revenue optimal allocation of items given a collection of expressive bids, has been widely studied. While winner determination algorithms have been designed to find optimal allocations with respect to cost and revenue, in many settings, features other than cost also play a role in accessing the quality of an allocation. For example, in a procurement auction, also known as a reverse auction, the bid taker may be concerned with the number of suppliers awarded business, the percentage of business awarded to a specific supplier, the average delivery-on-time rating of awarded business, and any of a number of other factors that can be tradeoff against cost. Most algorithms can be adapted to deal with such features, if, say, tradeoff weights are made explicit and incorporated into the objective function. However, most bid takers are unable or unwilling to articulate such precise tradeoffs.

One way to deal with this is to allow users to generate a collection of allocations by imposing various constraints on these features, e.g., limiting the number of suppliers to five, and examining the implications on the optimal allocation, e.g., how cost changes, by rerunning winner determination. When this process ends, the user chooses one of the generated allocations as making the right tradeoffs between costs and the relevant non-price attributes. Unfortunately, this manual process of scenario navigation does nothing to ensure sufficient or efficient exploration of allocations or tradeoff space.

It would therefore be desirable to overcome the above problems and others by providing a method of scenario navigation that enables an allocation to be identified that can be guaranteed to be within a predetermined range of an optimal allocation. Still other advantages of the present invention will become apparent to those of ordinary skill in the art upon reading and understanding the following detailed description.

SUMMARY OF THE INVENTION

The invention is a method of selecting a desirable allocation of bids in a combinatorial exchange setting. The method includes (a) providing a plurality of bids, each of which includes at least one item, a quantity for each item and price for all of the item(s) and their quantities; (b) selecting an adversarial allocation of the bids; (c) determining as a function of the adversarial allocation of the bids (1) a candidate allocation of the bids and (2) a value of a minimax regret related to a utility associated with the adversarial allocation minus a utility associated with the candidate allocation; (d) determining as a function of the candidate allocation (1) a new adversarial allocation of the bids and (2) a value of a maximum regret related to a utility associated with the new adversarial allocation minus a utility associated with the candidate allocation; (e) if the current value of the maximum regret is greater than the current value of the minimax regret, determining as a function of the adversarial allocation(s) (1) a new candidate allocation of the bids and (2) a new value of minimax regret related to a utility associated with the adversarial allocations minus a utility associated with the new candidate allocation; (f) determining as a function of the new candidate allocation (1) a new adversarial allocation of the bids and (2) a new value of maximum regret related to a utility associated with the new adversarial allocation minus a utility associated with the candidate allocations; and (g) repeating steps (e) and (f) until the current value of maximum regret is not greater than the current value of minimax regret.

Step (a) can further include associating initial bounds to at least one feature of the exchange. Each utility a measure of the usefulness of the corresponding allocation(s) to a buyer. Each utility is comprised of a value associated with at least one feature of the allocations over which the buyer has some preference. Each utility is comprised of a sum of a plurality of values associated with a like plurality of features of the corresponding allocation(s) over which the buyer has some preference.

The method can further include (h) determining at least one constraint for at least one pair of allocations; and (i) repeating steps (b)-(g) subject to the one constraint. The allocations can be candidate allocations.

Alternatively, the method can further include (h) amending at least one value associated with at least one feature; and (i) repeating steps (b)-(g).

The invention is also an apparatus for selecting a desirable allocation of bids in a combinatorial exchange. The apparatus includes means for receiving a plurality of bids, each of which includes at least one item, a quantity for each item and price for all of the item(s) and their quantities and means for forming a first adversarial allocation of the bids. Means can be provided for determining as a function of the first adversarial allocation of the bids (1) a first candidate allocation of the bids and (2) a first value of a minimax regret related to a difference between a utility associated with the adversarial allocation and a utility associated with the candidate allocation. Means can also be provided for determining as a function of the first candidate allocation (1) a second adversarial allocation of the bids and (2) a first value of a maximum regret related to a difference between a utility associated with the new adversarial allocation and a utility associated with the candidate allocation. Lastly, the apparatus includes means for producing a visually perceptible image of the first candidate allocation as the desirable allocation when the first value of the maximum regret is not greater than the first value of the minimax regret.

The apparatus can further include means for associating initial bounds to at least one feature of the exchange.

When the first value of the maximum regret is not greater than the first value of the minimax regret, the apparatus can further include means for determining as a function of the first adversarial allocation and the second adversarial allocation (1) a second candidate allocation of the bids and (2) a second value of minimax regret related to a difference between a utility associated with the first and second adversarial allocations, and a utility associated with the second candidate allocation; and means for determining as a function of the second candidate allocation (1) a third adversarial allocation of the bids and (2) a second value of maximum regret related to a difference between a utility associated with the third adversarial allocation and a utility associated with the second candidate allocation. Means can be provided for designating the second candidate allocation as the desirable allocation when the second value of the maximum regret is not greater than the second value of the minimax regret.

The apparatus can further include means for determining at least one constraint based on the selection of one at least one pair of allocations, wherein (1) the third adversarial allocation of the bids and (2) the second value of the maximum regret are determined subject to the one constraint.

The apparatus can further include means for determining as a function of at least one adversarial allocation a plurality of feasible allocations and means for determining at least one constraint based on at least one pair of allocations, wherein (1) at least one of the adversarial allocations of the bids and (2) one of the values of maximum regret are determined subject to the one constraint.

The visually perceptible image can be produced by one of a video monitor and a printer.

BRIEF DESCRIPTION OF THE DRAWINGS

FIG. 4 is a chart showing the inputs to and outputs from the below listed equations EQ1 and EQ2 for a number of solution cycles of equations EQ1 and EQ2.

DETAILED DESCRIPTION OF THE INVENTION

The present invention is generally directed to a method of selecting a desirable allocation of bids in a combinatorial exchange, such as a combinatorial forward auction, a combinatorial reverse auction, or a pure combinatorial exchange, and, more particularly, to a method of selecting an allocation that is within a desired range of an optimal allocation.

Figure 1:
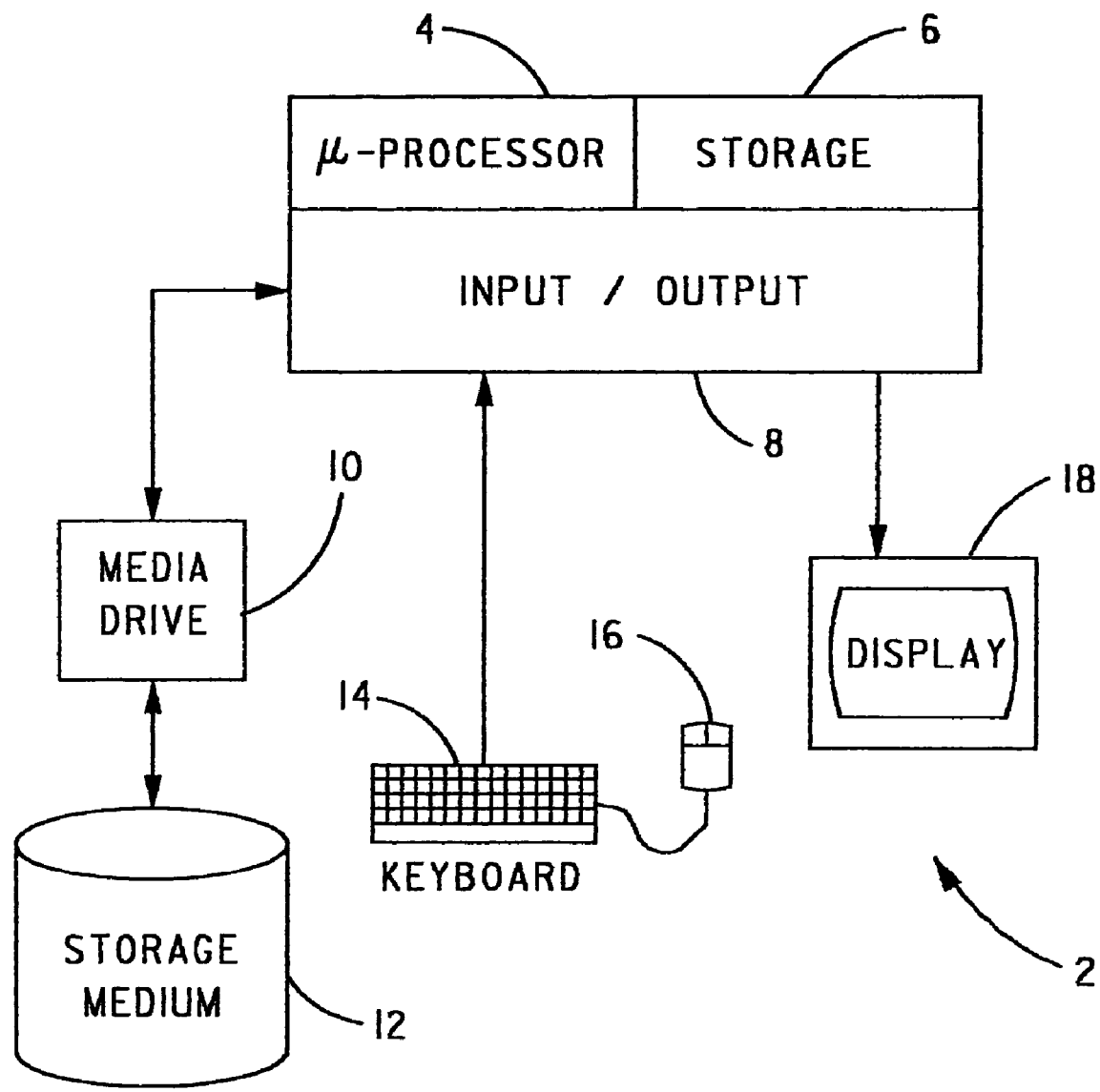
FIG. 1 is a schematic illustration of a computer system which implements computer software which embodies the present the invention.

With reference to FIG. 1, the present invention is embodied in computer-readable program code which executes on one or more computer systems 2. Each computer system 2 includes a microprocessor 4, a computer storage 6 and an input/output system 8. Each computer system 2 can also include a media drive 10, such as a disk drive, CD ROM drive, and the like. Media drive 10 can be operated under the control of the computer-readable program code that resides in a computer-usable storage medium 12. The computer-readable program code is able to configure and operate computer system 2 in a manner to implement the present invention. Input/output system 8 can include a keyboard 14, a mouse 16 and/or a display means 18, such as a video monitor, a printer or any other means for producing a visually perceptible image. Computer system 2 is exemplary of computer system(s) capable of executing the computer-readable program code of the present invention and is not to be construed as limiting the invention.

Figure 2:
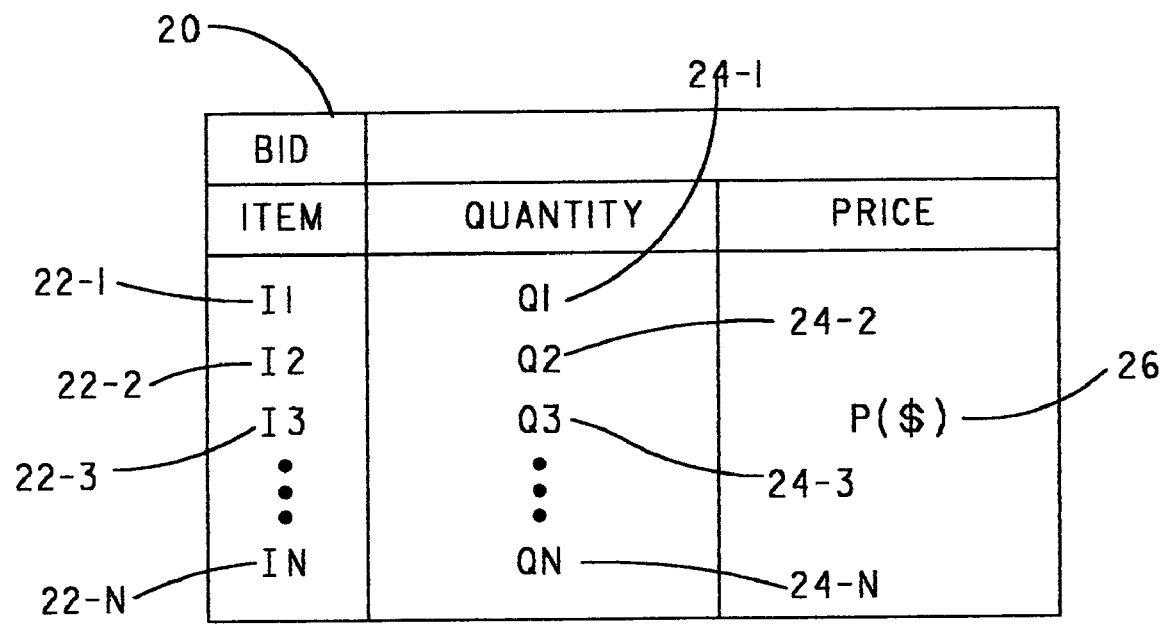
FIG. 2 is a diagrammatic illustration of an exemplary bid in a combinatorial exchange.

With reference to FIG. 2 and with continuing reference to FIG. 1, an exemplary bid 20 that can be input into computer system 2 for processing under the control of the computer-readable program code includes one or more items or goods 22-1, 22-2, 22-3 ... 22-N having associated quantities 24-1, 24-2, 24-3 ... 24-N, respectively, and an associated bid price 26.

In order to understand the present invention, it will be first necessary to understand the concept of "regret" and, more particularly, to understand the concepts of "maximum regret" and "minimax regret". A simple example will help illustrate these concepts.

Suppose a buyer in a reverse auction is trying to decide which of three bids, Bid 1, Bid 2 and Bid 3, to accept. In this example, it is assumed there is only one buyer.

In order to make a decision, the buyer either consciously or unconsciously weights each bid based on the buyers "utility" for one or more features associated with one or more of the bids, wherein the buyer has some preference over each feature. Exemplary features that the buyer may have some preference over that the buyer wishes to associate a utility value with can include, without limitation, minimum price, a maximum number of suppliers, a cost of transporting the item(s) associated with each bid, a quality rating of the bidder, and the like.

Suppose as a result of evaluating all the features of interest to the buyer, the buyer associates a utility value of 4 with Bid 1; a utility value of 6 with Bid 2; and a utility value of 2 with Bid 3.

In an auction setting, the buyer desirably maximizes his utility. This maximum utility is represented by the utility value having the largest value associated with Bid 1, Bid 2 or Bid 3. In the present example, Bid 2 has the largest utility value, i.e., 6, meaning that the buyer believes Bid 2 has the greatest utility. Hence, in this example, the buyer would choose Bid 2.

Often, however, the buyer's determination of utility, as represented by the utility value associated with each bid, is not so straightforward. To this end, a buyer's utility for a particular bid may involve a number of competing tradeoffs. For example, as the price of a bid decreases, the buyer's utility value assigned by the buyer to the bid increases which can compensate for a lower feature value of the supplier's quality rating.

Accordingly, in practice, each bid in the present example will typically have a range of utilities, represented by a range of utility values associated with the bid. For example, suppose that the buyer in our example associates with each bid a range of utility values, wherein a lower utility value represents a lower bound on said range and an upper utility value represents an upper bound on said range. For example, suppose the bidder associates the range of utility values between 4 and 5 with Bid 1; the range of utility values between 2 and 6 with Bid 2; and the range of utility values between 1 and 4 with Bid 3. The range of utilities values for each bid represents the buyer's imprecise knowledge regarding the buyer's actual utility for the bid.

Now, suppose the bidder picks Bid 3 but, had he known his actual utility for all 3 bids would have picked Bid 2. In the worst case, the bidder would "regret" this decision by five (5) utility points, i.e., the upper bound utility value of 6 of Bid 2 minus the lower bound utility value 1 of Bid 3. The utility value of five (5) represents the "maximum regret" between Bid 3 and Bid 2.

Now, suppose the bidder picks Bid 3 but, had he known his actual utility for all 3 bids would have picked Bid 1 instead of Bid 3. In this case, the maximum the bidder would regret choosing Bid 3 instead of Bid 1 would be four (4) weight points, i.e., the upper bound utility value 5 of Bid 1 minus the lower bound utility value of 1 of Bid 3. The utility value of four (4) represents the "maximum regret" between Bid 3 and Bid 1.

The maximum regret for each pair of Bid 1, Bid 2 and Bid 3 for the range of utility values discussed above can be determined as follows:

1. If the buyer picks Bid 1, but had he known his actual utility for all 3 bids would have picked Bid 2, the maximum regret equals 6−4=2 utility points (where 6 is the upper bound utility value of Bid 2 and 4 is the lower bound utility value of Bid 1);
2. If the buyer picks Bid 1, but had he known his actual utility for all 3 bids would have picked Bid 3, the maximum regret equals 4−4=0 utility points (where 4 is the upper bound utility value of Bid 3 and 4 is the lower bound utility value of Bid 1);
3. If the buyer picks Bid 2, but had he known his actual utility for all 3 bids would have picked Bid 1, the maximum regret equals 5−2=3 utility points (where 5 is the upper bound utility value of Bid 1 and 2 is the lower bound utility value of Bid 2);
4. If the buyer picks Bid 2, but had he known his actual utility for all 3 bids would have picked Bid 3, the maximum regret equals 4−2=2 utility points (where 4 is the upper bound utility value of Bid 3 and 2 is the lower bound utility value of Bid 2);
5. If the buyer picks Bid 3, but had he known his actual utility for all 3 bids would have picked Bid 1, the maximum regret equals 5−1=4 utility points (where 5 is the upper bound utility value of Bid 1 and 1 is the lower bound utility value of Bid 3); and
6. If the buyer picks Bid 3, but had he known his actual utility for all 3 bids would have picked Bid 2, the maximum regret equals 6−1=5 utility points (where 6 is the upper bound utility value of Bid 2 and 1 is the lower bound utility value of Bid 3).

The buyer not wanting to make a bad decision evaluates the worst case scenarios for each of his options as follows:

1. If the buyer picks Bid 1, his "maximum regret" is 2 utility points;
2. If the buyer picks Bid 2, his "maximum regret" is 3 utility points; and
3. If the buyer picks Bid 3, his "maximum regret" is 5 utility points.

In this example, the buyer would logically choose Bid 1 because Bid 1 has the minimum-maximum regret, or so-called "minimax regret", associated therewith. Stated differently, Bid 1 is said to be the bid with optimal "minimax regret" and 2 is its maximum regret.

In the foregoing example, a single range of utility values was associated with each bid. In this case, the range of utility values associated with each bid may have been related to the price of the bid. If desired, however, a plurality of utility value ranges can be associated with each bid, with each utility value range related to a different feature over which the buyer has some preference. Moreover, each bid in the foregoing example can be replaced with an allocation of bids that would be more common in a combinatorial type auction. Thus, for example, Bid 1 could be replaced with a first allocation of bids, wherein said first allocation includes one or more bids of the type shown in FIG. 2. Similarly, Bids 2 and 3 can be replaced with second and third allocations, respectively. Thereafter, the concepts of "maximum regret" and "minimax regret" can be applied to pairs of allocations in the same manner as they are applied to pairs of bids in the foregoing example.

Having described the concepts of "maximum regret" and "minimax regret" the invention will now be described with reference to the following equations EQ1 and EQ2 which can be solved utilizing well know and commercially available software, such as the CPLEX optimizing software available from ILOG, Inc., 1080 Linda Vista Avenue, Mountainview, Calif. 94043. Each of equations EQ1 and EQ2 is solved subject to the constraints listed below the respective equation.

EQ 1: $\min_{x \in X} \delta$ such that $\delta \geq$ $$\sum_{i=1}^{j} \{w_i \uparrow [f_i(x')A_i^+[x'] - F_i^+[x]] + w_i \downarrow [f_i(x')A_i^-[x'] - F_i^-[x]]\} - c(x') + c(x) \forall \, x' \in Gen_k$$

where
X=set of all feasible allocations;
j=number of features of interest;
x'=adversarial allocation;
x=candidate allocation;
δ=approximation of minimax regret for x';
$Gen_k = \{x_1', x_2', \ldots x_k'\}$ for some set of feasible allocation(s) x';
$f_i$=a feature over which a buyer has some preference, e.g., number of winners, supplier quality rating, price, etc.;
c=actual cost (sum of the prices (P) of the bids included in the corresponding allocation);
$A_i^+[x']$=a Boolean variable for each feature $f_i$ and each adversarial allocation x' contained in $Gen_k$. Denotes that $f_i(x') > f_i(x)$;
$A_i^-[x']$=a Boolean variable for each feature $f_i$ and each adversarial allocation x' contained in $Gen_k$. Denotes that $f_i(x') < f_i(x)$;
$F_i^+[x]$=a variable (one per x' in $Gen_k$) that takes on the value of $f_i(x)$ if $A_i^+[x']$ is true, otherwise it takes on the value of 0;
$F_i^-[x]$=a variable (one per x' in $Gen_k$) that takes on the value of $f_i(x)$ if $A_i^-[x']$ is true, otherwise it takes on the value of 0;
$w_i \uparrow$ =upper bound utility value of feature $f_i$;
$w_i \downarrow$ =lower bound utility value of feature $f_i$;
$u_i$=a constant that limits the maximum value feature $f_i$ can take on in any feasible allocation; and
$m_i$=a constant that limits the maximum difference between any two distinct values of feature $f_i$ among feasible allocations.

The following constraints are imposed to ensure that the foregoing variables in EQ1 have their desired meaning:
$f_i(x) - f_i(x') \leq m_i(1 - A_i^+[x'])$, for all $f_i, x'$ in $Gen_k$;
$f_i(x') - f_i(x) \leq m_i(1 - A_i^-[x'])$, for all $f_i, x'$ in $Gen_k$;
$A_i^+[x'] + A_i^-[x'] = 1$, for all i, x';
$F_i^+[x] \leq u_i A_i^+[x']$ and $F_i^+ \leq f_i(x)$, for all $f_i, x'$ in $Gen_k$; and
$F_i^-[x] \leq u_i A_i^-[x']$ and $F_i^- \leq f_i(x)$, for all $f_i, x'$ in $Gen_k$.

EQ 2: $MR(x) =$ $$\max_{x' \in X} \sum_{i=1}^{j} \{w_i \uparrow [G_i^+ - f_i(x)B_i^+] + w_i \downarrow [G_i^- - f_i(x)B_i^-]\} - c(x') + c(x)$$

where

X=set of all feasible allocations;

j=number of features of interest;

MR(x)=maximum regret of candidate allocation x;

x'=new adversarial allocation;

x=candidate allocation;

c=actual cost (sum of the prices (P) of the bids included in the corresponding allocation);

$f_i$=a feature over which a buyer has some preference, e.g., number of winners, supplier quality rating, price, etc.;

$B_i^+$=a Boolean variable (one per feature $f_i$) indicating that $f_i(X) > f_i(x)$;

$B_i^-$=a Boolean variable (one per feature $f_i$) indicating that $f_i(X) < f_i(x)$;

$G_i^+$=a variable that takes on the value $f_i(X)$ if $B_i^+$ is true, otherwise it takes on the value 0;

$G_i^-$=a variable that takes on the value $f_i(X)$ if $B_i^-$ is true, otherwise it takes on the value 0;

$w_i\uparrow$=upper bound utility value of feature $f_i$;

$w_i\downarrow$=lower bound utility value of feature $f_i$;

$u_i$=a constant that limits the maximum value feature $f_i$ can take on in any feasible allocation; and $m_i$=a constant that limits the maximum difference between any two distinct values of feature $f_i$ among feasible allocations.

The following constraints are imposed to ensure that the foregoing variables in EQ2 have their desired meaning:

$f_i(x')-f_i(x) \leq m_i(1-B_i^+)$ for each feature $f_i$: this ensures that if feature $f_i$ has a greater value in the adversary's allocation X than in allocation x, then $B_i^-=0$;

$f_i(x)-f_i(x') \leq m_i(1-B_i^-)$ for each feature $f_i$: this ensures that if feature $f_i$ has a greater value in allocation x than in the adversary's allocation X, then $B_i^+=0$;

$B_i^+ B_i^- \leq 1$: this ensures that exactly one of variables $B_i^+ + B_i^-$ holds (this can be an equality);

$G_i^+ \leq u_i B_i^+$ and $G_i^+ \leq f_i(x')$ for each feature $f_i$: these ensure that $G_i^+$ is 0 if the adversary's value for feature $f_i$ is less than mine, and is equal to the adversary's value for $f_i$ if it is greater than mine; and $G_i^- \leq u_i B_i^-$ and $G_i^- \leq f_i(x')$ for each feature $f_i$: these ensure that $G_i^-$ is 0 if the adversary's value for feature $f_i$ is less than mine, and is equal to the adversary's value for $f_i$ if it is greater than mine.

With reference to the flow diagram of FIG. 3 and the chart of FIG. 4, the use of equations EQ1 and EQ2 will now be described.

Figure 3:
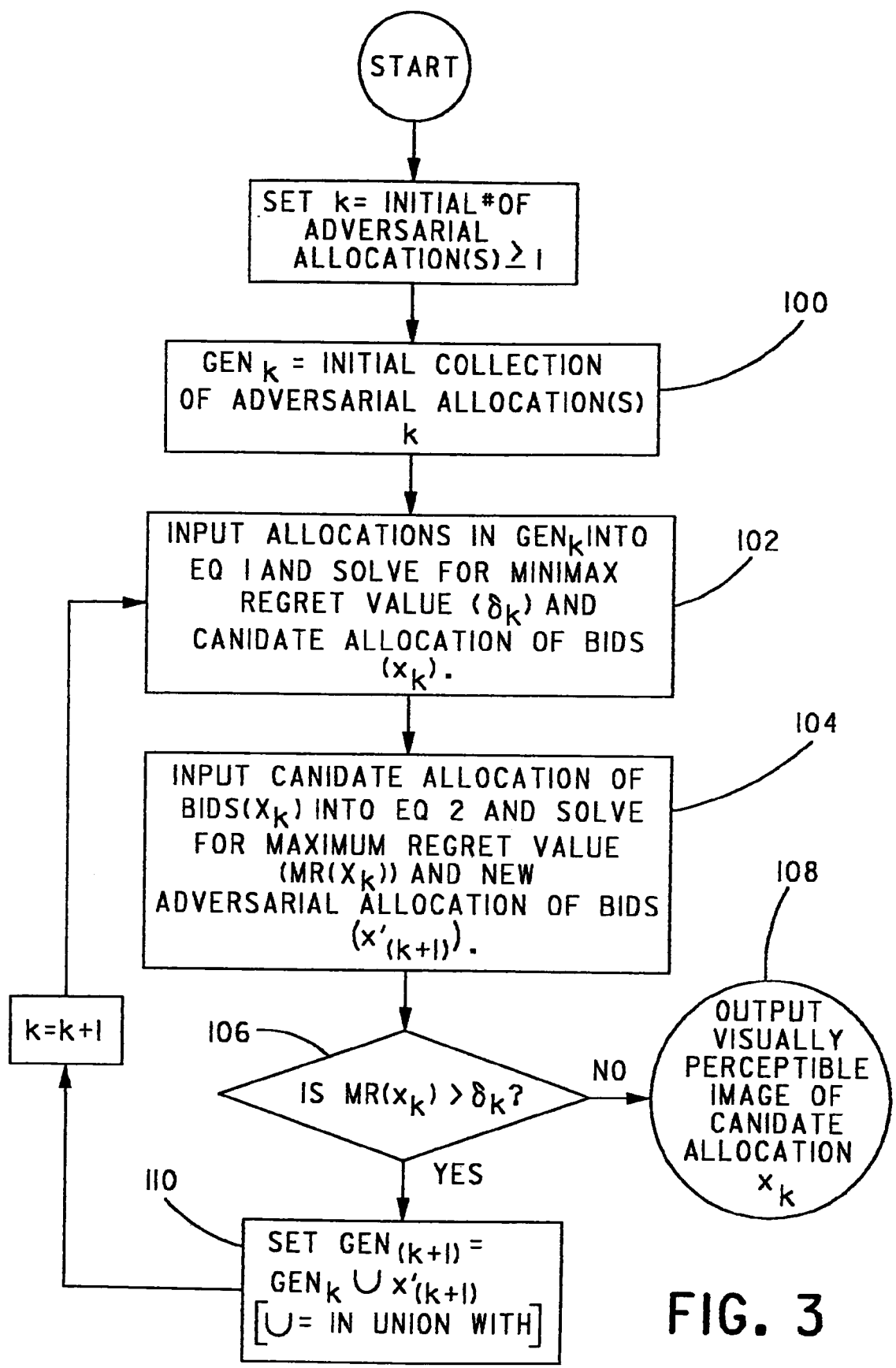
FIG. 3 is a flow diagram of a method of utilizing the below listed equations EQ1 and EQ2 in accordance with the present invention.

Initially, in step 100 of the flow diagram of FIG. 3, $Gen_k$, representing a set of arbitrary feasible allocations, is instantiated with one or more adversarial allocations. In other words, in step 100, one or more initial adversarial allocation(s) are selected and included in $Gen_k$. For the purpose of describing the present invention, $Gen_k$ will be described as initially including a single adversarial allocation $x_1'$, i.e., $Gen_1 = \{x_1'\}$ and k is assigned an initial value equal to the number of adversarial allocations included in $Gen_k$, in this case k=1. However, this is not to be construed as limiting the invention since $Gen_k$ can initially include 2 or more adversarial allocations and the initial value of k can track the number of adversarial allocations initially included in $Gen_k$.

Next, in step 102, equation EQ1 is solved for the set of adversarial allocation(s) in $Gen_1$ to determine a minimax regret value $\delta_1$ and a candidate allocation $x_1$. In step 104, the thus determined candidate allocation $x_1$ is substituted for x in equation EQ2 which is solved to determine a maximum regret value $MR(x_1)$ and a new adversarial allocation $x_{(k+1)}'$, i.e., $x_2'$. This completes a first cycle of solving equations and EQ1 and EQ2. The inputs into and outputs from equations EQ1 and EQ2 for this first cycle are shown in FIG. 4.

In step 106, a determination is made whether the maximum regret value $MR(x_1)$ is greater than the minimax regret value $\delta_1$, i.e., $MR(x_1) > \delta_1$. If not, the maximum regret value $MR(x_1)$ is deemed to be the optimal minimax regret value and the method of FIG. 3 advances to step 108, wherein a visually perceptible image of at least candidate allocation $x_1$ is produced, for example on display 18. The use of equations EQ1 and EQ2 is then terminated and candidate allocation $x_1$ is deemed to be the allocation that optimal with respect to maximum regret.

However, if the maximum regret value $MR(x_1)$ is greater than the minimax regret value $\delta_1$, step 110 is executed wherein the new adversarial allocation $x_2'$ is included in union with $Gen_1$ to define $Gen_2$, whereupon $Gen_2 = \{x_1', x_2'\}$.

Step 102 is then reexecuted wherein equation EQ1 is solved for the set of adversarial allocation(s) in $Gen_2$. Solving equation EQ1 for adversarial allocations $x_1'$ and $x_2'$ yields a new minimax regret value $\delta_2$ and a new candidate allocation $x_2$.

In step 104, candidate allocation $x_2$ is substituted for x in equation EQ2 and a new maximum regret value $MR(x_2)$ is determined for this candidate allocation $x_2$ along with a new adversarial allocation $x_{(k+1)}'$ or $x_3'$. This concludes the second cycle of equations EQ1 and EQ2 as shown in FIG. 4.

In step 106, if the maximum regret value of $MR(x_2)$ is not greater than the minimax regret value of $\delta_2$, the use of equations EQ1 and EQ2 is terminated and step 108 is executed since the maximum regret value of $MR(x_2)$ is deemed to be the optimal minimax regret and candidate allocation $x_2$ is deemed to be the allocation that is optimal with respect to maximum regret.

However, if the maximum regret value of $MR(x_2)$ is greater than the minimax regret value of $\delta_2$, in step 110, adversarial allocation $x_3'$ is included in union with $Gen_2$ to define $Gen_3$, whereupon $Gen_3 = \{x_1', x_2', x_3'\}$.

Step 102 is than reexecuted wherein equation EQ1 is solved for each adversarial allocation in $Gen_3$ to determine a new minimax regret value $\delta_3$ and a new candidate allocation $x_3$. In step 104, candidate allocation $x_3$ is then substituted for x in equation EQ2 which is solved to determine a new maximum regret value $MR(x_3)$ and a new adversarial allocation $x_{(k+1)}'$ or $x_4'$. This concludes the third cycle of equations EQ1 and EQ2 as shown in FIG. 4.

In step 106, an evaluation is made to determine if the maximum regret value $MR(x_3)$ is greater than the minimax regret value $\delta_3$. If not, the maximum regret value $MR(x_3)$ is deemed to be the optimal minimax regret value, candidate allocation $x_3$ is deemed to be the allocation that optimal with respect to maximum regret, and the method advances to step 108. Otherwise, step 110 and steps 102-108 of the flow diagram of FIG. 3 are repeated, as necessary, for additional cycles of equations EQ1 and EQ2 until the maximum regret value MR(x) of one of the cycles is not greater than the minimax regret value $\delta$ in said cycle. Alternatively, the steps of the flow diagram of FIG. 3 can terminated after some number of cycles of equations EQ1 and EQ2 or when the difference between the maximum regret value MR(x) and the minimax regret value δ for a particular cycle is within a predetermined value.

A precondition to utilizing equations EQ1 and EQ2 is the assignment of a unique upper bound weight value ($w_i\uparrow$) to each feature $f_i$ and a unique lower bound weight value ($w_i\downarrow$) to each feature $f_i$. Thus, each feature $f_i$ of the allocation over which a buyer has some preference, e.g., number of winners, supplier quality rating, price, and the like, has a unique upper bound value and a unique lower bound value associated therewith by the buyer. Thus, the solutions of equations EQ1 and EQ2 are contingent upon the upper and lower bound weight values assigned to each feature over which the buyer has some preference as is the determination of values for minimax regret (δ) and maximum regret MR(x).

In many circumstances, more general constraints on the weight values $w_i$ are present, for example, general linear constraints. For example, suppose that the buyer had expressed a preference for allocation $x_1$ over allocation $x_2$. Furthermore, suppose that the buyer cared about two allocation features $f_1$ and $f_2$, e.g., number of winners and average supplier quality rating. Finally, suppose that allocation $x_1$ has feature values 10 and 7 for $f_1$ and $f_2$, respectively, and a total price of $1000; and allocation $x_2$ has feature values 6 and 8 for $f_1$ and $f_2$, respectively, and a total price of $1200. The fact that the buyer prefers $x_1$ to x2 implies that the weights values $w_1$ and $w_2$ representing the buyer's utility for different allocations must satisfy the inequality:

$$10w_1+7w_2-\$1000 > 6w_1+8w_2-\$1200$$

General linear constraints of this form can be generated by the buyer expressing such allocation preferences, though such constraints may be obtained in other ways. The method described above in connection with equations EQ1 and EQ2 works only when the constraints on weight values take the form of upper and lower bounds. The present invention, however, can also determine a minimax optimal allocation value δ when these more general linear constraints hold. This will now be described.

Suppose a set C of linear constraints is provided (including, but not limited to, upper and lower bounds) on the weights $w_i$. The allocation x with minimax regret can be determined from following equation EQ3, which is the general form of equations EQ1 and EQ2:

$$\text{EQ 3:} \quad \min_{x \in X} \max_{w \in W, x' \in X} \sum_{i=1}^{j} \{w_i[f_i(x') - f_i(x)] - c(x') + c(x)\}$$

where
X is the set of all feasible allocations;
W is the set of all feasible weight vectors (those weights satisfying the constraints in set C);
c is the actual cost of an allocation;
$f_i$ is a feature over which the buyer has some preference.
x' is an adversarial allocation;
x is a candidate allocation; and
j is the number of features of interest;

The following equations EQ4 and EQ5 can be used when additional information besides features weights is available for at least one feature $f_i$ to solve EQ3. Specifically, equation EQ4 can be solved to obtain a candidate allocation x while equation EQ5 can be solved to generate a new "pair" of an adversarial allocation and adversarial weight vector, i.e., $\{x_k', w^k\}$.

$$\text{EQ 4:} \quad \min_{x \in X} \delta \text{ such that } \delta \geq$$

$$\sum_{i=1}^{j} \{w_i[f_i(x') - f_i(x)] - c(x') + c(x)\} \text{ for all pairs } <x', w> \text{ in } Gen_k$$

where
$Gen_k$ is a collection of k pairs of adversarial allocation(s) and adversarial weight vector(s), i.e., $\{<x_1', w^1>; <x_2', w^2>; \ldots <x_k', w^k>\}$;
x' is an adversarial allocation;
x is a candidate allocation;
X is the set of all feasible allocations;
$w^k$ is a weight vector comprising j weight values $w_1^k, w_2^k, \ldots w_j^k$;
δ is an approximation of the minimax regret for x;
j is the number of features of interest;
c is the actual cost of an allocation; and
$f_i$ is a feature over which the buyer has some preference.

Equation EQ4 is solved at the $k^{th}$ iteration with $Gen_k$ containing k $\{x_k', w^k\}$ pairs. The output of EQ4 is a candidate allocation $x_1$ and a value $δ_1$ that approximates minimax regret.

Given candidate allocation $x_1$, its maximum regret $MR(x_1)$ can be found by solving the following equation EQ5 for $x_1$:

$$\text{EQ 5:} \quad MR(x) = \max_{w \in W, x' \in X} \sum_{i=1}^{j} \{w_i[f_i(x') - f_i(x)] - c(x') + c(x)\};$$

subject to the set of linear constraints in C.

In equation EQ5, weights $w_i$ and adversarial allocation x' are variables. Equation EQ5 is a standard quadratic integer program with a quadratic objective and linear constraints and can be solved directly to obtain a value for maximum regret $MR(x_1)$, a new adversarial allocation $x_1'$ and a new adversarial weight vector $w^1$ using well know and commercially available software, such as the CPLEX optimizing software.

If the thus determined maximum regret value $MR(x_1)$ is not greater than the approximation value $δ_1$ of minimax regret, the maximum regret value $MR(x_1)$ is deemed to the optimal minimax regret value, $x_1$ is deemed to be the desired allocation which is output as a visually perceptible image, for example on display 18, and the use of equations EQ4 and EQ5 is terminated. However, if the maximum regret value $MR(x_1)$ is greater than the approximate value $δ_1$ of minimax regret, the new adversarial allocation $x_1'$ and the new adversarial weight vector $w^1$ are included in the current instance of set Gen (i.e., $x_1'$ and $w^1$ are included in union with the adversarial allocation(s) and adversarial weight vector(s) already included in the set Gen) thereby forming a new instance of set Gen.

Given this new instance of set Gen, equations EQ4 and EQ5 can be reexecuted in the foregoing manner to determine a new candidate allocation $x_2$, a new approximation value $δ_2$ of minimax regret, a new maximum regret $MR(x_2)$, a new adversarial allocation $x_2'$ and a new adversarial weight vector $w^2$.

If the thus determined maximum regret value $MR(x_2)$ is not greater than the approximation value $\delta_2$ of minimax regret, the maximum regret value $MR(x_2)$ is deemed to the optimal minimax regret value, $x_2$ is deemed to be the desired allocation which is output as a visually perceptible image, for example on display 18, and the use of equations EQ4 and EQ5 is terminated. However, if the maximum regret value $MR(x_2)$ is greater than the new approximation value $\delta_2$ of minimax regret, another instance of set Gen is generated by including adversarial allocation $x_2'$ and adversarial weight vector $w^2$ in union with the adversarial allocation(s) and adversarial weight vector(s) included in the current instance of set Gen. Equations EQ4 and EQ5 can then be reexecuted again to determine another new candidate allocation $x_3$, another new approximate value $\delta_3$ of minimax regret, another new maximum regret $MR(x_3)$, another new adversarial allocation $x_3'$ and another new adversarial weight vector $w^3$.

The foregoing process of determining if the current maximum regret value $MR(x)$ is not (or is) greater than the current approximation value $\delta$ of minimax regret, and the use of equations EQ4 and EQ5, as necessary, to determine additional candidate allocation(s) x, additional approximation value(s) $\delta$ of minimax regret, additional maximum regret value(s) $MR(x)$, additional adversarial allocation(s) x' and additional weight vector(s) w can be repeated iteratively in the foregoing manner until a current maximum regret value $MR(x)$ is determined not to be greater than the current approximation value $\delta$ of minimax regret, whereupon the current candidate allocation can be output as a visually perceptible image, for example on display 18. The use of equations EQ4 and EQ5 can then be terminated. Alternatively, the iterative use of equations EQ4 and EQ5 can be terminated after some predetermined number of solution cycles of equations EQ4 and EQ5 or when the difference between the current maximum regret value $MR(x)$ and the current approximation value $\delta$ of minimax regret for a particular solution cycle of equations EQ4 and EQ5 is within a predetermined value.

Alternatively, instead of using the combination of equations EQ4 and EQ5, the combination of equation EQ4 with the following equations EQ6 and EQ7 can be utilized. In other words, instead of using equation EQ5 to determine the maximum regret value $MR(x)$ of candidate allocation x, equations EQ6 and EQ7 can be utilized to determine the maximum regret value $MR(x)$ of candidate allocation x as follows:

Initially, an arbitrary feasible weight vector, i.e., any $w^1$, that satisfies the set of linear constraints in C is selected and utilized to solve equation EQ6 (The "1" in "$w^1$" means that $w^1$ is the first weight vector. It has j components $\{w_1^1, w_2^1, \ldots w_j^1\}$).

$$\text{EQ 6:} \quad \gamma = \max_{x' \in X} \sum_{i=1}^{j} \{w_i^1 [f_i(x') - f_i(x)] - c(x') + c(x)\};$$

Since the weights $\{w_1^1, w_2^1, \ldots w_j^1\}$ in equation EQ6 are constants—not variables, EQ6 is a standard linear integer program that can be solved using a well know and commercial available LP solver, such as the CPLEX optimizing software. The solution to equation EQ6 generates an adversarial allocation $x_1'$ as well as an approximation $\gamma_1$ of the maximum regret of x. This adversarial allocation $x_1'$ is substituted for adversarial allocation x' in the following equation EQ7 which is solved, subject to the set of linear constraints in C, to yield a weight vector $w^2 = \{w_1^2, w_2^2, \ldots w_j^2\}$ as well as an approximation $\beta$ of the maximum regret of x.

$$\text{EQ 7:} \quad \beta = \max_{w \in W} \sum_{i=1}^{j} \{w_i [f_i(x') - f_i(x)] - c(x') + c(x)\};$$

Since adversarial allocation x' in equation EQ7 is a constant—not a variable, equation EQ7 is a standard linear program that can be solved using a well know and commercial available LP solver, such as the CPLEX optimizing software.

If the current value of $\beta$ (the approximation of maximum regret) produced by the solution of equation EQ7 is equal to the current value of $\gamma$ (the approximation of minimax regret for x) produced by the solution of equation EQ6, the current value of $\beta$ is deemed to be the maximum regret $MR(x)$ of candidate allocation x. However, if the current value of $\beta$ is greater than the current value of $\gamma$, equation EQ6 is reexecuted using weight vector $w^2$ substituted for weight vector $w^1$.

Solving equation EQ6 using weight vector $w^2$ yields an adversarial allocation $x_2'$ and a new value for $\gamma$. If this new value of $\gamma$ equals (=) the previous approximation of $\beta$, $\beta$ is deemed to be the maximum regret $MR(x)$ of candidate allocation x. If the new value of $\gamma$ is greater than (>) the previous approximation of $\beta$, $x_2'$ is used as the input to equation EQ7 and equation EQ7 is executed.

This process of iteratively using equation EQ6 and EQ7 continues until the current value of $\gamma$ equals (=) either the current value of $\beta$ or the previous value of $\beta$, whereupon the value of $\beta$ that solves this equality is deemed to be the maximum regret $MR(x)$ of candidate allocation x, and $x_n'$ and $w^n$ are deemed to be the adversarial allocation and adversarial weight vector, respectively.

The following algorithm illustrates in detail the steps utilized for determining the minimax regret $\delta$ of candidate allocation x utilizing equation EQ4 in combination with equations EQ6 and EQ7. In the following algorithm, unless otherwise instructed by a "goto" instruction, the steps are executed consecutively.

Algorithm:

Step 1. Set k=1.

Step 2. Select an initial adversarial allocation $x_1'$ and adversarial weight vector $w^1$. Initialize the collection $\text{Gen}_k$ of adversarial allocation-weight vector pairs to contain the single pair $<x_1', w^1>$.

Step 3. Input the collection $\text{Gen}_k$ into equation EQ4, and solve equation EQ4 to produce a minimax regret value $\delta_k$ and candidate allocation $x_k$.

Step 4. Set n=1.

Step 5. Set temporary adversarial weight vector $w^n$ to be an arbitrary feasible weight vector (any vector satisfying the linear constraints contained in set C).

Step 6. Input candidate allocation $x_k$ and temporary adversarial weight vector $w^n$ into equation EQ6, and solve equation EQ6 to produce a maximum regret value $\gamma_n$ and temporary adversarial allocation $x_n'$.

Step 7. Input candidate allocation $x_k$ and temporary adversarial allocation $x_n'$ into equation EQ7, and solve equation EQ7 to produce a maximum regret value $\beta_n$ and new temporary adversarial weight vector $w^{n+1)}$.

Step 8. If $\beta_n=\gamma_n$, set temporary adversarial allocation $x_{(n+1)}'=x_n'$, then goto Step 11. Otherwise if $\beta_n>\gamma_n$, goto Step 9.

Step 9. Input candidate allocation $x_k$ and temporary adversarial weight vector $w^{(n+1)}$ into equation EQ6 and solve equation EQ6 to produce a maximum regret value $\gamma_{(n+1)}$ and temporary adversarial allocation $x_{(n+1)}'$.

Step 10. If $\gamma_{(n+1)}=\beta_n$, goto Step 11. Otherwise, if $\gamma_{(n+1)}>\beta_n$, increase n by 1 (n=n+1) and goto Step 7.

Step 11. Set $MR(x_k)=\beta_n$.

Step 12. Set adversarial allocation $x_{(k+1)}'$=temporary adversarial allocation $x_{(n+1)}'$.

Step 13. Set adversarial weight vector $w^{(k+1)}$=temporary adversarial weight vector $w^{(n+1)}$ Step 14. If $MR(x_k)\leq\delta_k$, goto Step 18.

Step 15. Set $Gen_{(k+1)}=Gen_k \cup \{x_{(k+1)}', w^{(k+1)}\}$, where $\cup$ means union.

Step 16. k=k+1.

Step 17. Goto Step 3.

Step 18. Output candidate allocation $x_k$ as a visually perceptible image, for example on display 18 (Solution is candidate allocation $x_k$, maximum regret of $x_k$ is $MR(x_k)$, adversarial allocation is $x_{(k+1)}'$, and adversarial weight vector is $w^{(n+1)}$).

Alternatively, instead of iteratively utilizing equations EQ6 and EQ7 in the foregoing algorithm, the loops representing equations EQ6 and EQ7 can be replaced by equation EQ5.

The present invention also includes an alternate method to solve equation EQ3, which is especially useful when the number of features $f_i$ is small. This alternate method removes the alternation between equations EQ4 and EQ5 (or equation EQ4 and equations EQ6 and EQ7) described above by generating the entire set of adversarial allocations—weight vectors, e.g., $<x^1,w>$, in Gen before solving equation EQ4 the first time; that is, without the use of a candidate allocation x.

By way of background, each feature's $f_i$ weight bounds ($w\uparrow$ and $w\downarrow$) in combination with the linear constraints in set C define a convex polytope in j dimensions, which can be thought of as the feasible utility space. Each point in this polytope corresponds to a feasible weight vector $w^k$. As would be apparent to one skilled in the art, any adversarial weight vector $w^n$ that could be chosen as part of a solution to equation EQ5 must lie at an extreme point of this polytope. Furthermore, for a given adversarial weight vector, e.g., $w^1$, it can be shown that the feasible allocation $x_k$ which maximizes utility for that weight vector will always be the regret maximizing allocation, or adversarial allocation $x'$, chosen with said weight vector by equation EQ5.

Given these observations, it becomes possible to enumerate a set of extreme points P of the utility polytope utilizing a well know and readily available software program, such as, for example, PORTA available at the following URL:

http://www.iwr.uni-heidelberg.de/groups/comopt/software/PORTA/.

Then, for each point $p_m$ contained in P, determine the optimal allocation $x_m'$ for the weight vector $p_m$, and add the pair $<x_m', p_m>$ to the set Gen. Once all points $p_m$ in P have been processed, equation EQ4 can be solved one time. The allocation x will be designated as the desirable allocation, and $\delta$ will be the minimax regret value of allocation x.

If, after determining that a maximum regret value MR(x) is not greater than a minimax regret value $\delta$, the buyer is not satisfied with either the value of the maximum regret MR(x) or the corresponding candidate allocation x, the buyer may, if he wishes, increase the lower bound weight value and/or decrease the upper bound weight value of at least one feature $f_i$ thereby reducing the range of values therebetween. Reducing the range of values between an upper bound weight value and a lower bound weight value essentially further constrains the solution of maximum regret MR(x), whereupon the maximum regret value MR(x) that is not greater than the corresponding minimax regret value $\delta$ will be no more than, and often less than, the maximum regret value MR(x) that was determined before further constraining the range of weight values.

The weight value $w_i$ for each feature $f_i$ that maximizes the maximum regret value MR(x) can be made available to the buyer to facilitate the buyer making an informed decision regarding which feature(s) to reduce the range of weight values for the next usage thereof to determine the minimax regret value $\delta$.

For example, a buyer evaluating weight values selected by the optimizing software to maximize the regret value MR(x) for candidate allocation x may arbitrarily decide that narrowing the range of weight values of feature $f_i$, e.g., supplier quality, is the best choice for increasing the buyer's utility, whereupon the buyer's minimax regret $\delta$ decreases the next time it is determined. Obviously, the buyer can elect to reduce the range of weight values for more than one feature $f_i$ if desired.

One problem with arbitrarily reducing the range of weight values for one or more features $f_i$ is that there is no guarantee that such arbitrary reduction will, in fact, result in a reduction of the minimax regret $\delta$ the next time it is determined. Accordingly, it would be desirable to utilize a more systematic approach.

Once such approach includes the buyer deciding that he prefers a candidate allocation x more than an adversarial allocation x' included in Gen, or vise versa. The candidate allocation x and the last adversarial allocation x' included in Gen that can be used for this comparison can be the ones that resulted in proving that the maximum regret value of MR(x) is not greater than the minimax regret value of $\delta$. The buyer's selection of one of these allocations over the other can be coded as a constraint which is included in the constraints that the optimizing software utilizes to determine the next value of maximum regret MR(x) and the next value of minimax regret $\delta$ the next time they are determined. For example, a constraint can be coded to express the buyer's preference that candidate allocation x is preferred (>) over a last adversarial allocation x' included in Gen, or vise versa.

Other allocations that can be compared, selected and coded into constraints include, without limitation: infeasible allocations and arbitrary feasible allocations. It is envisioned that the buyer can pair-wise compare any combination of candidate allocation(s) (either the solution candidate allocation or an intermediate candidate allocation), adversarial allocation(s) x' (either the solution candidate allocation or an intermediate candidate allocation), infeasible allocation(s) and/or arbitrary feasible allocation(s). The buyer's preferential selection of one of the allocations of each pair of allocations over the other can then be coded into a corresponding constraint that the optimizing software can utilize. Hence, the specific pair-wise comparisons of any pair of allocations and the coding described above are not to be construed as limiting the invention.

Moreover, the number of pair-wise comparisons of allocations described above is not to be construed as limiting the invention since it is envisioned that any number of pair-wise comparisons can be made and coded into corresponding constraints utilized by the optimizing software.

As can be seen, the present invention enables the buyer in a combinatorial auction or exchange to randomly or systematically determine the allocation that, in the worst case, is within a range of an optimal allocation for a range of values assigned to each feature of interest to the buyer. Thus, in spite of the uncertainty that exists because of the buyer assigning a range of values to one or more features of interest to the buyer, an allocation can be identified that can be guaranteed to be within a range of the optimal allocation.

The present invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method of selecting a desirable allocation of bids in a combinatorial exchange setting comprising:
   (a) providing a plurality of bids, each of which includes at least one item, a quantity for each item and price for all of the item(s) and their quantities;
   (b) selecting an adversarial allocation of the bids;
   (c) determining as a function of the adversarial allocation of the bids (1) a candidate allocation of the bids and (2) a value of a minimax regret related to a utility associated with the adversarial allocation minus a utility associated with the candidate allocation;
   (d) determining as a function of the candidate allocation (1) a new adversarial allocation of the bids and (2) a value of a maximum regret related to a utility associated with the new adversarial allocation minus a utility associated with the candidate allocation;
   (e) if the current value of the maximum regret is greater than the current value of the minimax regret, determining as a function of the adversarial allocation(s) (1) a new candidate allocation of the bids and (2) a new value of minimax regret related to a utility associated with the adversarial allocations minus a utility associated with the new candidate allocation;
   (f) determining as a function of the new candidate allocation (1) a new adversarial allocation of the bids and (2) a new value of maximum regret related to a utility associated with the new adversarial allocation minus a utility associated with the candidate allocations; and
   (g) repeating steps (e) and (f) until the current value of maximum regret is not greater than the current value of minimax regret.

2. The method of claim 1, wherein step (a) further includes associating initial bounds to at least one feature of the exchange.

3. The method of claim 1, wherein each utility is a measure of the usefulness of the corresponding allocation(s) to a buyer.

4. The method of claim 3, wherein each utility is comprised of a value associated with at least one feature of the allocations over which the buyer has some preference.

5. The method of claim 4, wherein each utility is comprised of a sum of a plurality of values associated with a like plurality of features of the corresponding allocation(s) over which the buyer has some preference.

6. The method of claim 1, further including:
   (h) determining at least one constraint for at least one pair of allocations; and
   (i) repeating steps (b)-(g) subject to the one constraint.

7. The method of claim 6, wherein each pair of allocations includes (1) a candidate allocation and an adversarial allocation, (2) a pair of candidate allocations or (3) a pair of adversarial allocations.

8. The method of claim 5, further including:
   (h) amending at least one value associated with at least one feature; and
   (i) repeating steps (b)-(g).

9. An apparatus for selecting a desirable allocation of bids in a combinatorial exchange comprising:
   means for receiving a plurality of bids, each of which includes at least one item, a quantity for each item and price for all of the item(s) and their quantities;
   means for forming a first adversarial allocation of the bids;
   means for determining as a function of the first adversarial allocation of the bids (1) a first candidate allocation of the bids and (2) a first value of a minimax regret related to a difference between a utility associated with the adversarial allocation and a utility associated with the candidate allocation;
   means for determining as a function of the first candidate allocation (1) a second adversarial allocation of the bids and (2) a first value of a maximum regret related to a difference between a utility associated with the new adversarial allocation and a utility associated with the candidate allocation; and
   means for producing a visual display of the first candidate allocation as the desirable allocation when the first value of the maximum regret is not greater than the first value of the minimax regret.

10. The apparatus of claim 9, further including means for associating initial bounds to at least one feature of the exchange.

11. The apparatus of claim 9, wherein, when the first value of the maximum regret is not greater than the first value of the minimax regret, further including:
   means for determining as a function of the first adversarial allocation and the second adversarial allocation (1) a second candidate allocation of the bids and (2) a second value of minimax regret related to a difference between a utility associated with the first and second adversarial allocations, and a utility associated with the second candidate allocation;
   means for determining as a function of the second candidate allocation (1) a third adversarial allocation of the bids and (2) a second value of maximum regret related to a difference between a utility associated with the third adversarial allocation and a utility associated with the second candidate allocation; and
   means for designating the second candidate allocation as the desirable allocation when the second value of the maximum regret is not greater than the second value of the minimax regret.

12. The apparatus of claim 11, further including means for determining at least one constraint based on the selection of at least one pair of allocations, wherein (1) the third adversarial allocation of the bids and (2) the second value of the maximum regret are determined subject to the one constraint.

13. The apparatus of claim 11, further including means for determining as a function of at least one adversarial allocation a plurality of feasible allocations and means for determining at least one constraint based on at least one pair of allocations, wherein (1) at least one of the adversarial allocations of the bids and (2) one of the values of maximum regret are determined subject to the one constraint.

14. The apparatus of claim 9, wherein the visual display is produced by one of a video monitor and a printer.

* * * * *